(12) United States Patent
Balcerzak et al.

(10) Patent No.: US 7,661,749 B2
(45) Date of Patent: Feb. 16, 2010

(54) INTERIOR TRIM ASSEMBLY AND METHOD FOR OPERATING THE SAME

(75) Inventors: Mark Balcerzak, Rochester Hills, MI (US); Dan Mc Dermott, Grand Blanc, MI (US); Syed Hasan, Troy, MI (US)

(73) Assignee: Magna International Inc., Aurora (CA)

( * ) Notice: Subject to any disclaimer, the term of this patent is extended or adjusted under 35 U.S.C. 154(b) by 63 days.

(21) Appl. No.: 11/938,614

(22) Filed: Nov. 12, 2007

(65) Prior Publication Data

US 2009/0121508 A1 May 14, 2009

(51) Int. Cl.
*B60J 3/00* (2006.01)
(52) U.S. Cl. .............. 296/97.5; 296/97.1; 296/214
(58) Field of Classification Search .......... 296/97.1, 296/97.5, 214
See application file for complete search history.

(56) References Cited

U.S. PATENT DOCUMENTS 6,959,956 B1 * 11/2005 Fero et al. ............... 296/97.5
2003/0053642 A1 * 3/2003 Bank et al. .............. 381/152

* cited by examiner

*Primary Examiner*—Lori L Lyjak
(74) *Attorney, Agent, or Firm*—Honigman Miller Schwartz and Cohn LLP

(57) ABSTRACT

An interior trim assembly for a vehicle includes a trim component having a first panel; a second panel opposite the first panel; and one or more side panels joining the first and second panels. The first, second and one or more side panels define a cavity; and an acoustic transducer is disposed within the cavity. The acoustic transducer is located adjacent an interior surface of one of the first, second and side panels. Also, the assembly is movable relative to a static headliner.

10 Claims, 4 Drawing Sheets

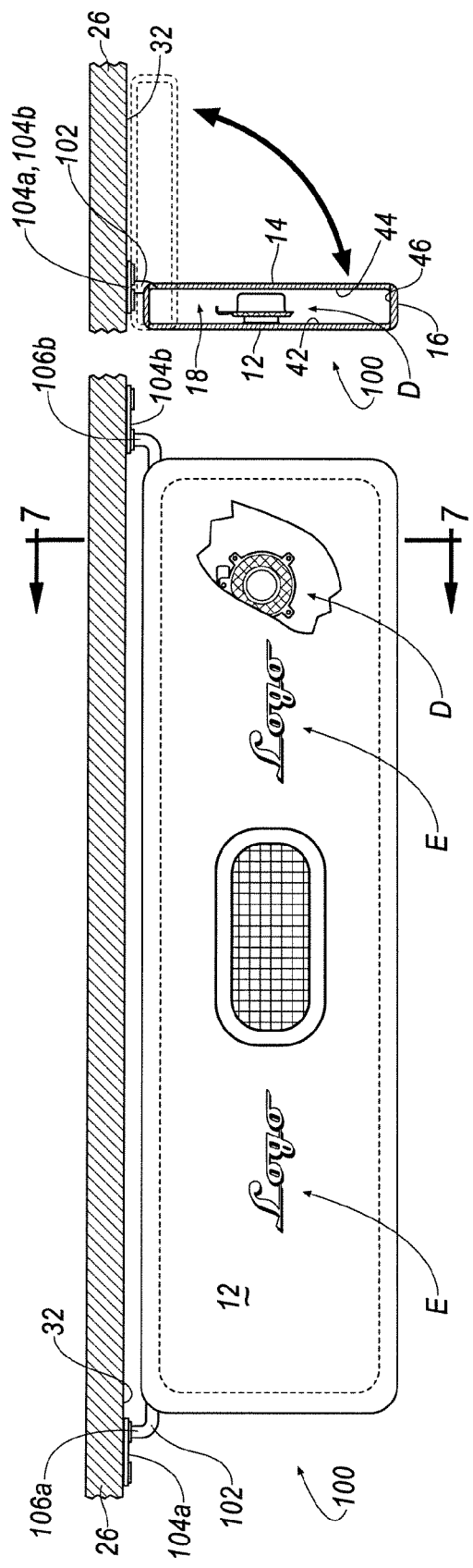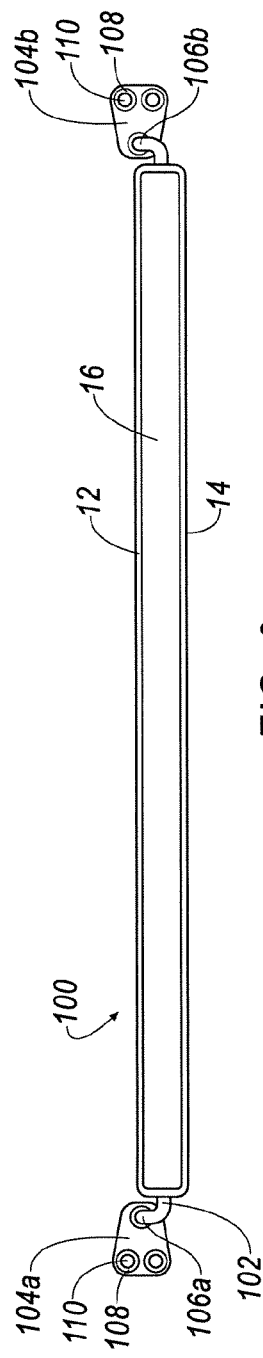

INTERIOR TRIM ASSEMBLY AND METHOD FOR OPERATING THE SAME

TECHNICAL FIELD

The invention relates in general to an interior trim assembly and a method for operating the same.

BACKGROUND

It is known in the art that people located in a passenger compartment area of a vehicle have access to a variety of devices such as, for example, audio devices, video devices, lighting devices, and the like. However, if vehicle end-users are located outside of the passenger compartment area and desire access to the function(s) associated with one or more of such devices, certain limitations and inconveniences may apply.

For example, end-users may congregate exterior to the vehicle (e.g., the end-users may be said to be "tailgaiting") while also desiring access to the vehicle's audio output from speakers that are located within the passenger compartment. Accordingly, in this instance, there is an inconvenience factor in having to roll down the windows such that audio output from the speakers may be projected through the window opening. Further, because the audio output of the speakers is directed to the passenger compartment area and not through the window openings for propagation toward the tailgaters, there is a inherent limitation of the reception of the audio output from the speakers toward the tailgaters. To overcome the audio reception limitation described above, an end user may have to increase the volume of the audio output from the speakers such that the increase in volume may ultimately increase the potential of failure or degraded performance of the speakers.

As such, a need exists in the art for an interior trim assembly and a method for operating the same such that the above limitations and inconveniences are overcome.

BRIEF DESCRIPTION OF THE DRAWINGS

The disclosure will now be described, by way of example, with reference to the accompanying drawings, in which:

FIG. 5 illustrates a front perspective view of an interior trim component in accordance with an exemplary embodiment of the invention;

FIG. 6 illustrates a bottom perspective view of the interior trim component of FIG. 5 in accordance with an exemplary embodiment of the invention; and FIG. 7 illustrates a cross-sectional view of the interior trim component of FIG. 5 according to line 7-7.

DETAILED DESCRIPTION

The Figures illustrate an exemplary embodiment of an interior trim assembly and a method for operating the same in accordance with an embodiment of the invention. Based on the foregoing, it is to be generally understood that the nomenclature used herein is simply for convenience and the terms used to describe the invention should be given the broadest meaning by one of ordinary skill in the art.

Referring to FIGS. 1-4B, a trim component is shown generally at 10 according to an embodiment. The trim component 10 is generally defined to include a length, L, and width, W (see, e.g., FIG. 1). Further, the trim component 10 is generally defined to include a thickness, T (see, e.g., FIGS. 4A-4B). Although the trim component 10 is described to include a length, L, width, W, and thickness, T, it will be appreciated that the trim component 10 is not necessarily limited to a generally flat, cubical, or square/rectangular shape and that the interior trim component 10 may include and desirable shape, contour or the like.

Figure 4A:
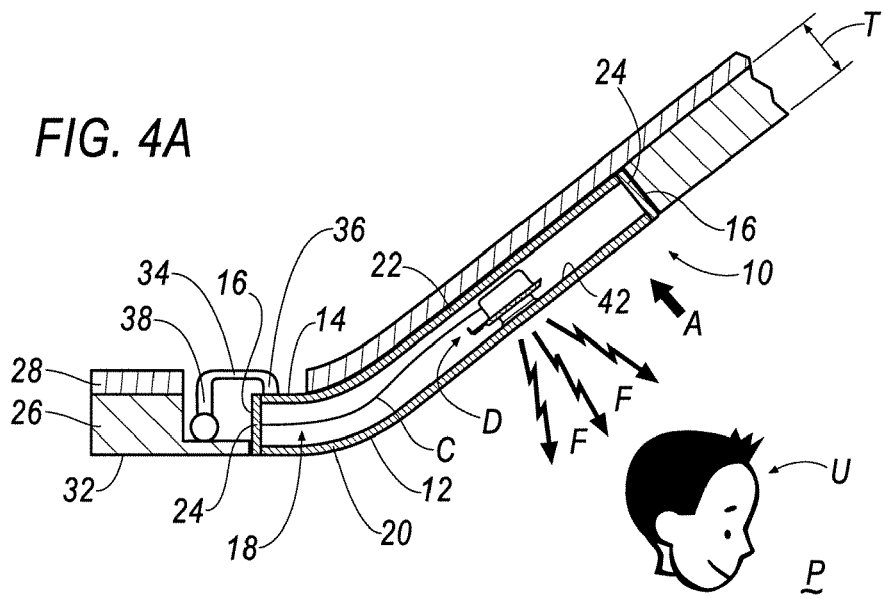
FIG. 4A illustrates a cross-sectional view of the interior trim component of FIG. 2 according to line 4A-4A.
Figure 4B:
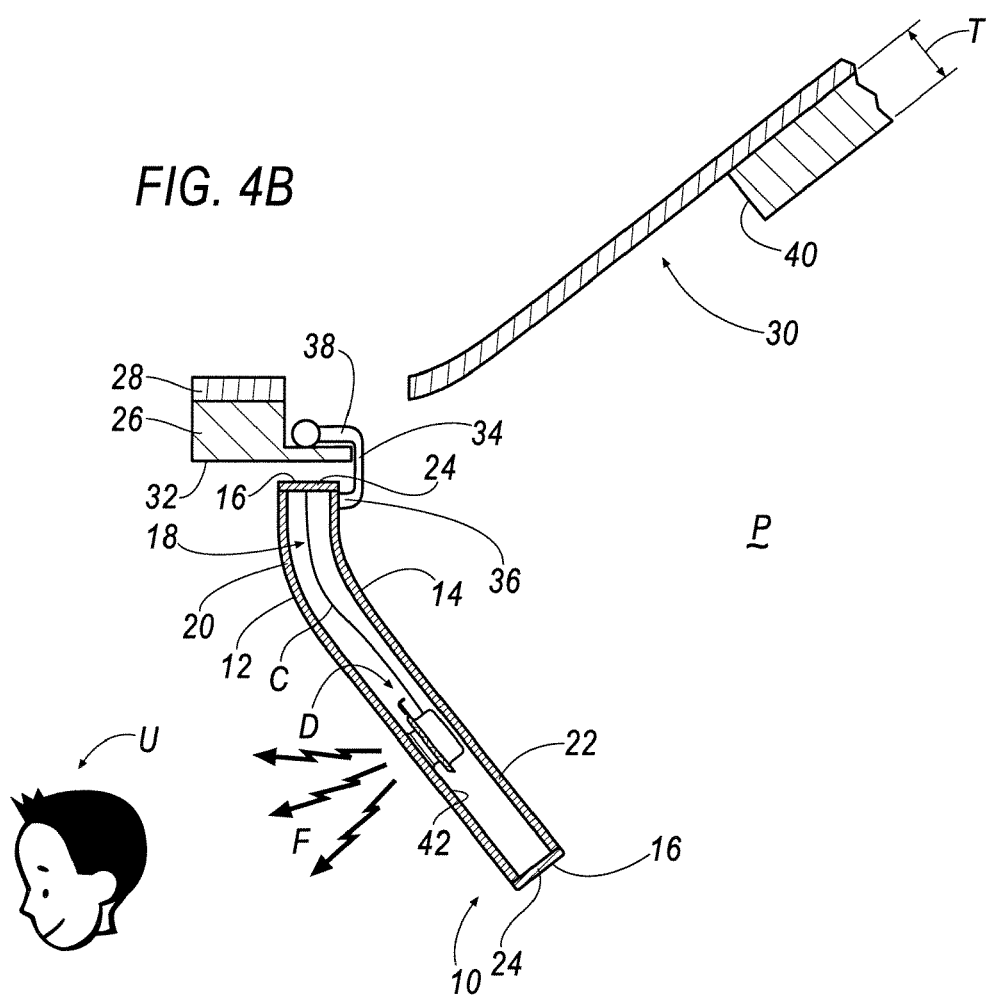
FIG. 4B illustrates a cross-sectional view of the interior trim component of FIGS. 3A and 3B according to line 4B-4B.

In an embodiment, the trim component 10 may include a first outer surface 12, a second outer surface 14 and an outer side surface 16. In an embodiment, as seen in FIGS. 4A-4B, the trim component 10 may be further defined to include a cavity 18. The cavity 18 is defined by a first panel 20, a second panel 22 opposite the first panel 20 and one or more side panels 24 that join the first and second panels 20, 22. As illustrated, the side panels 24 abut ends of the first and second panels 20, 22. Alternatively, in an embodiment, the side panels 24 may be disposed between the first and second panels 20, 22. Although the invention has been described to include a plurality of panels 20-24, it will be appreciated that the trim component 10 may include as few as one or any desirable number of panels and is not limited to a specific number of panels, arrangement of panels, or the like.

Disposed within the cavity 18 may be one or more devices, D, such as, for example, a speaker transducer, lighting component, or the like. However, it will be appreciated that the trim component 10 may not include a cavity 18, and, as such, may be substantially solid. If the trim component 10 is solid, the trim component may be defined by a single panel having a thickness, T, and, the one or more devices, D, may be mounted to one or more of the outer surfaces 12-16.

Figure 1:
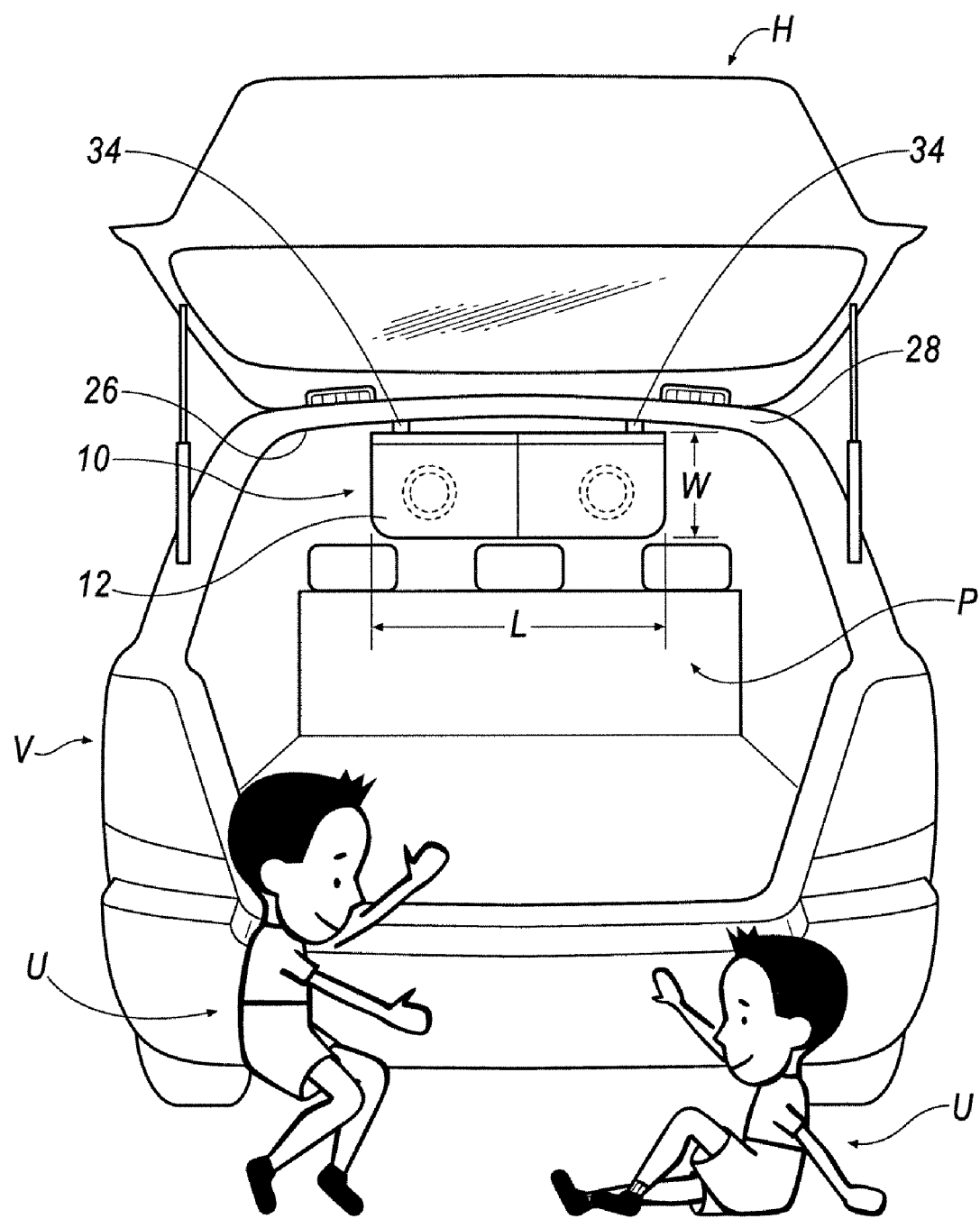
FIG. 1 illustrate an environmental view of an interior trim component in accordance with an exemplary embodiment of the invention.

As seen in FIGS. 1-4B, the trim component 10 is movably-attached to an interior trim panel, which is shown generally at 26. The interior trim panel 26 may be, for example, a headliner that trims roof structure 28 of a vehicle, V (FIG. 1). The headliner 26 includes a thickness that, in an embodiment, may be substantially equal to the thickness, T, of the trim component 10. Although not shown FIGS. 4A and 4B, the headliner 26 may include a plurality of layers of material, such as, for example, a fabric skin layer, an intermediate foam layer and a substrate layer. However, it will be appreciated that the headliner 26 is not limited to include any particular type or number of layers.

Figure 2:
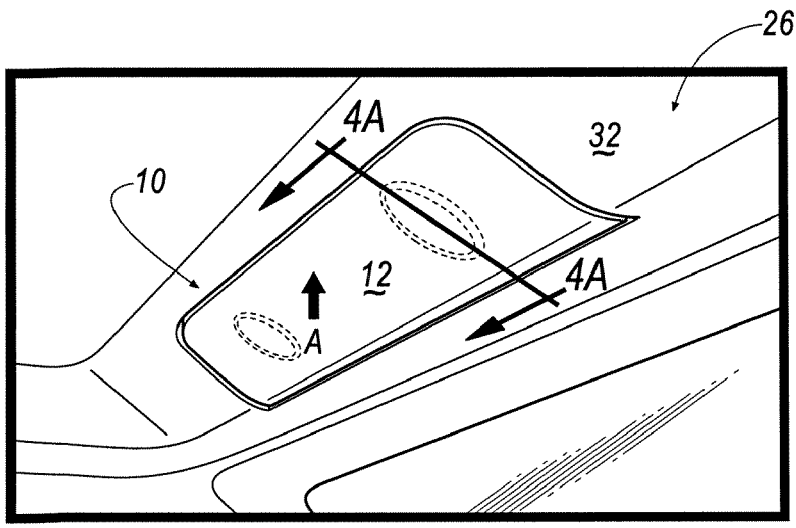
FIG. 2 illustrates a perspective view of the interior trim component of FIG. 1 in a stowed position relative an interior trim panel in accordance with an exemplary embodiment of the invention.
Figure 3A:
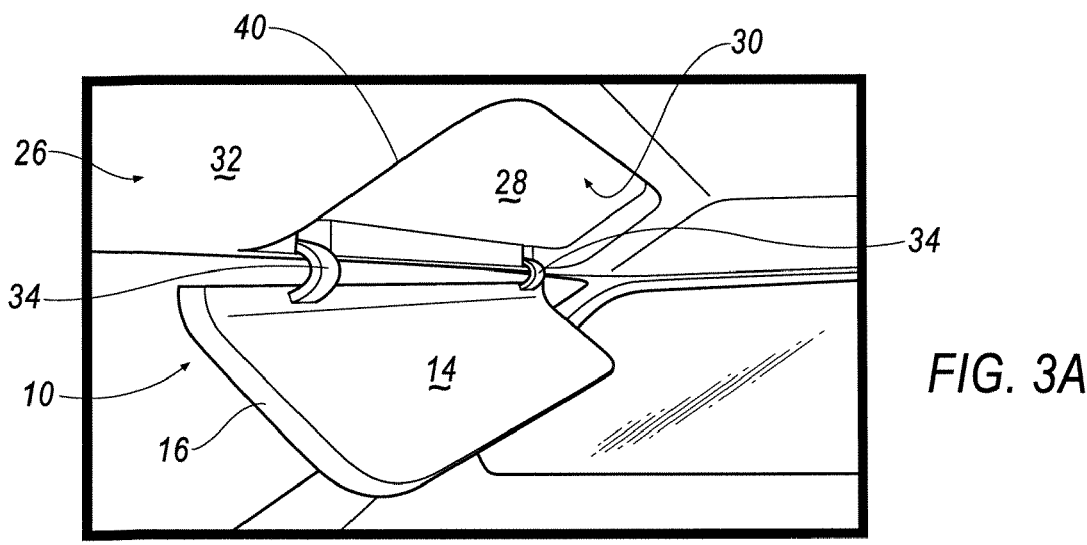
FIG. 3A illustrates a perspective view of the interior trim component of FIG. 1 in a deployed position in accordance with an exemplary embodiment of the invention according to an interior viewing perspective relative a passenger compartment area of the vehicle.
Figure 3B:
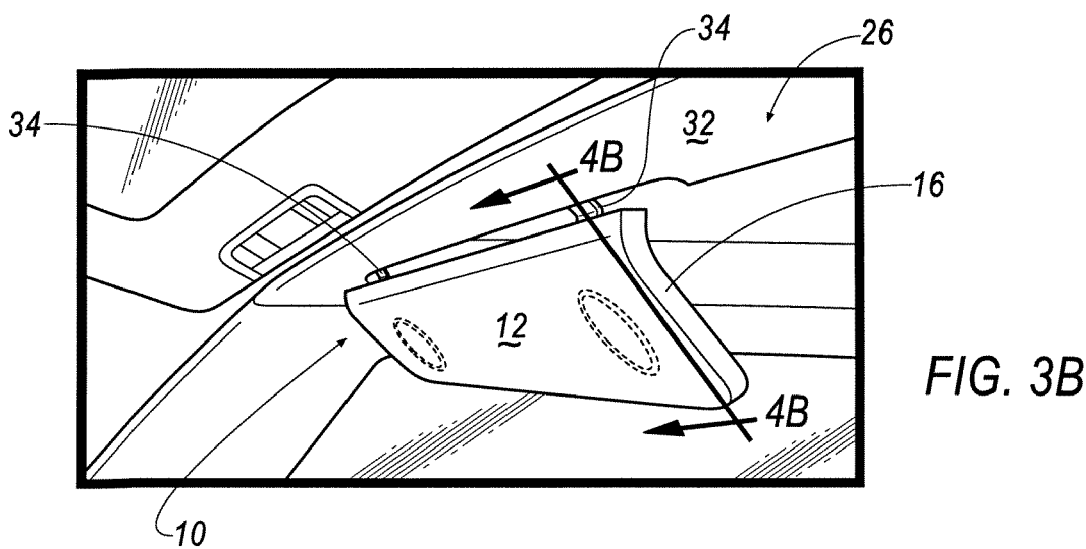
FIG. 3B illustrates a perspective view of the interior trim component of FIG. 1 in a deployed position in accordance with an exemplary embodiment of the invention according to an exterior viewing perspective relative the passenger compartment area of the vehicle.

As seen in FIGS. 3A and 4B, the headliner 26 may define a recess 30 that accommodates the trim component 10 when the trim component 10 is moved to a stowed position (see, e.g., FIGS. 2 and 4A). When moved to the stowed position, the first outer surface 12 is substantially continuous with an A- or show-surface 32 of the headliner 26. If desired, the first outer surface 12 may include a similar color and/or texture as that of the show-surface 32 of the headliner 26. If desired, both the first outer surface 12 and show-surface 32 may comprise a fabric material. If desired, the first outer surface 12 may include an embossed pattern or design, E (see, e.g., FIG. 5), that represents a logo or the like.

Movement of the trim component 10 to and from a stowed position and a deployed position (see, e.g., FIGS. 1, 3A-3B and 4B) is provided by way of a pivotable arm 34. Referring to FIGS. 4A and 4B, in an embodiment, a first end 36 of the pivotable arm 34 is fixed to the trim component 10. In an embodiment, the first end 36 is fixed to the second surface 14. In an embodiment, a second end 38 of the pivotable arm 34 is pivotably-fixed to the headliner 26.

Further, the trim component 10 may include a latch (not shown) to retain the trim component 10 in the stowed position. A first component (not shown) of the latch, such as, for example, a hook, may be located on/proximate the second outer surface 14 and/or the side outer surface 16 of the trim component 10 with a second component (not shown) of the latch, such as, for example, a loop, being located on/proximate a perimeter 40 of the recess 30 defined by the headliner 26. If desired, the latch may include a "push-push" device that permits deployment of the trim component 10 to the deployed position. According to an embodiment, in order to unlatch the "push-push" device, a user, U, may apply a force to the first outer surface 12 generally in the direction and location of the arrow, A, as shown in FIGS. 2 and 4A when the trim component 10 is located in the stowed position. Further, a dampening mechanism (not shown), such as, for example, a spring, may be located proximate the second end 38 of the pivotable arm 34 such that the trim component 10 resists a free-fall movement once the latch is released.

As described above, a device, D, may be disposed within/on the trim component 10. A conductor, C, may be attached to the device, D, to provide power and/or operating signals to the device, D. In an embodiment, the device, D, may include a pistonic transducer. According to an embodiment as shown in FIGS. 4A and 4B, the pistonic transducer, D, is mounted adjacent a first interior surface 42 of the first panel 20. As illustrated, the first panel 20 also includes the first outer surface 12.

When the pistonic transducer, D, is mounted as described above, the trim component 10 may function as a speaker panel that substantially propagates acoustic frequencies, F, away from the first outer surface 12 of the first panel 20. Because the trim component 10 propagates acoustic frequencies, F, away from the first outer surface 12, the trim component 10 provides a "hidden" speaker system for the vehicle, V, such that an opening in the trim component 10 and associated grill to protect a conventional speaker cone proximate the opening are eliminated.

Accordingly, if the trim component 10 is a source for providing acoustic frequencies, F, the acoustic frequencies, F, may be selectively directed according to the positioning of the trim component 10 relative the headliner 26. Selective direction of the acoustic frequencies, F, may be provided by moving the trim component 10 to and from the stowed position and a deployed position.

As seen in FIG. 4A, when the trim component 10 is moved to a stowed position, the acoustic frequencies, F, may be directed toward a user, U, in the passenger compartment area, P, of the vehicle, V. Alternatively, as seen in FIG. 4B, when the trim component 10 is moved to a deployed position, the acoustic frequencies, F, may be directed toward a user, U, and away from the passenger compartment area, P, of the vehicle, V.

As seen in FIG. 1, if desired, a lift-gate or hatch-back door, H, of the vehicle, V, may be moved from a closed position to an open position. When the hatch-back door, H, is moved to the open position, the trim component 10 may be subsequently moved to a deployed position such that users, U, that are tailgaiting behind the vehicle, V, and exterior to the passenger compartment area, P, may enjoy music or the like defined by the acoustic frequencies, F.

Although the above-described embodiment of the trim component 10 is defined to include a device, D, that is a source for providing acoustic frequencies, F, it will be appreciated that one or more devices, D, having other functions may also be included in/on the trim component 10. For example, a lighting device, D, may be associated with the trim component 10. Alternatively, the device, D, may include a screen or monitor that provides video originating from, for example, a digital video disc (DVD). As such, it will be appreciated that the trim component 10 is not limited to a specific number of devices, D, or particular function.

Referring to FIGS. 5-7, a trim component is shown generally at 100 according to an embodiment. The trim component 100 is substantially similar to the trim component 10 and may include one or more devices, D. In view of the trim component 10, however, the trim component 100 does not include a pivotable arm 34 to permit movement of the trim component 100 relative the headliner 26; rather the trim component 100 is pivotably-connected to a rod 102 to permit movement of the trim component 100 relative the headliner 26. As will be explained in greater detail below, the rod 102 is attached to the show-surface 32 of the headliner 26 by way of one or more brackets 104a, 104b.

In an embodiment, the rod 102 may extend through the cavity 18 and be connected to the first interior surface 42 of the first panel 20, a second interior surface 44 of the second panel 22, or a third interior surface 46 of the one or more side panels 24. However, it will be appreciated that the rod 102 is not limited to be attached to the first, second or third interior surfaces 42-46 and that the rod 102 may be attached to any of the first, second, or side outer surfaces 12-16. The rod 102 may be attached to any of the surfaces 12-16, 42-46 by way of, for example, a leaf-spring bracket to retain the trim component in a stowed or deployed position.

Further, in view of the trim component 10, the trim component 100 is not stowable within a recess 30 defined by the headliner 26. Alternatively, in an embodiment, the trim component 100 is stowed adjacent the show-surface 32 of the headliner 26 when moved to the stowed position (see, e.g., FIG. 7). However, if desired, it will be appreciated that the rod 102 may be fixed to and disposed within the thickness of the headliner 10 such that the headliner 26 provides a recess 30 for receiving the trim component 100 when the trim component 100 is moved to the stowed position.

In an embodiment, first and second ends 106a, 106b of the rod 102 are fixed, respectively, to first and second brackets 104a, 104b. The first and second ends 106a, 106b of the rod 102 may be snap-fit, integrally-molded or adhered to the first and second brackets 104a, 104b.

The first and second brackets 104a, 104b are fixed to the show-surface 32 of the headliner 26. The first and second brackets 104a, 104b may include one or more openings 108 to permit passage of a fastener 110 to secure the first and second brackets 104a, 104b to the headliner 26. Alternatively, the first and second brackets 104a, 104b may be snap-fit, heat-staked or adhered to the show-surface 32 of the headliner 26.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. An interior trim assembly for a vehicle, the vehicle having a trim panel, the trim assembly comprising;
   a trim component including a first panel, a second panel opposite the first panel, one or more side panels joining the first and second panels, wherein the first, second and one or more side panels define a cavity; and
   an acoustic transducer disposed within the cavity, wherein the acoustic transducer is located adjacent an interior surface of one of the first, second and side panels, and wherein the trim component is mounted to the trim panel of the vehicle and movable with respect thereto.

2. The interior trim assembly for a vehicle according to claim 1 wherein the trim panel is a headliner, the interior trim assembly further comprising a member that connects the trim component to the headliner.

3. The interior trim assembly for a vehicle according to claim 2, wherein the member includes a pivotable arm having a first end and second end, wherein the first end is fixed to one of the first, second and side panels, wherein the second end is pivotably-fixed to the headliner.

4. The interior trim assembly for a vehicle according to claim 2, wherein the member includes a rod connected to one or more brackets, wherein the rod is pivotably-connected to one of the first, second and side panels, wherein the one or more brackets is fixed to the headliner.

5. The interior trim assembly for a vehicle according to claim 1, further comprising a lighting device connected to one or more of the first, second and side panels.

6. An interior trim assembly for a vehicle, comprising;
   a headliner including a recess;
   a trim component connected to the headliner, wherein the trim component is disposable within the recesses; and
   an acoustic transducer disposed within the trim component, wherein the trim component is movable relative to the headliner.

7. The interior trim assembly for a vehicle according to claim 6, wherein the trim component includes;
   a first panel;
   a second panel opposite the first panel; and
   one or more side panels joining the first and second panels, wherein the first, second and one or more side panels define a cavity, wherein the acoustic transducer is disposed within the cavity, wherein the acoustic transducer is located adjacent an interior surface of one of the first, second and side panels.

8. The interior trim assembly for a vehicle according to claim 7, further comprising a pivotable arm having a first end and second end, wherein the first end is fixed to one of the first, second and side panels, wherein the second end is pivotably-fixed to the headliner.

9. A method for operating a trim assembly including a trim component and a headliner, wherein the trim component includes an acoustic transducer, comprising the steps of;
   providing the option of selectively moving the trim component connected to the headliner to one of two positions relative the headliner including a stowed position and a deployed position;
   activating the acoustic transducer connected to the trim component;
   propagating acoustics from the trim component; and
   directing the propagated acoustics toward a passenger compartment area of a vehicle when the trim component is selectively moved to the flowed position and away from the passenger compartment area of the vehicle when the trim component is selectively moved to the deployed position.

10. The method according to claim 9, further comprising the step of;
   moving a hatch-back door from a closed position to an open position to create an opening in the vehicle that exposes the passenger compartment area, whereby the trim component that is selectively moved to the deployed position directs the propagated acoustics through the opening and out of the passenger compartment area of the vehicle.

* * * * *